(12) United States Patent
Yamaguchi

(10) Patent No.: US 9,319,376 B2
(45) Date of Patent: Apr. 19, 2016

(54) INFORMATION PROCESSING APPARATUS, CONTROL METHOD, AND STORAGE MEDIUM

(71) Applicant: CANON KABUSHIKI KAISHA, Tokyo (JP)

(72) Inventor: Yoshinori Yamaguchi, Yamato (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/621,923

(22) Filed: Feb. 13, 2015

(65) Prior Publication Data
US 2015/0234622 A1    Aug. 20, 2015

(30) Foreign Application Priority Data
Feb. 14, 2014   (JP) .................................. 2014-026097

(51) Int. Cl.
*G06F 3/12* (2006.01)
*H04L 29/12* (2006.01)

(52) U.S. Cl.
CPC ..................................... *H04L 61/103* (2013.01)

(58) Field of Classification Search
USPC ................ 358/1.15, 1.16, 1.14, 468; 455/420
See application file for complete search history.

(56) References Cited

U.S. PATENT DOCUMENTS

| 2002/0064155 | A1* | 5/2002 | Yen et al. ...................... 370/390 |
| 2010/0245893 | A1* | 9/2010 | Kawata et al. ............... 358/1.15 |
| 2015/0062625 | A1* | 3/2015 | Kong ........................... 358/1.15 |
| 2015/0088688 | A1* | 3/2015 | Sakadume et al. ........... 705/26.8 |

FOREIGN PATENT DOCUMENTS

JP    2006-340286 A    12/2006

* cited by examiner

*Primary Examiner* — Jerome Grant, II
(74) *Attorney, Agent, or Firm* — Canon USA, Inc. IP Division

(57) ABSTRACT

Information processing apparatuses, control methods and storage mediums are provided, which may transmit or attempt to transmit data to a target device by using network information, modify a MAC address in the network information to a MAC address of a device having same device identification information as the target device when a communication with the target device is not established, and, when the MAC address is modified, transmit the data to the device having the same device identification information as the target device. In one or more embodiments, a network port monitor may transmit an inquiry notification by way of broadcast when data is not transmitted to the target device. When a response to the inquiry notification is received from a device having same device identification information as the target device, the device having the same device identification information is set as a new connection or transmission destination.

12 Claims, 10 Drawing Sheets

FIG. 6

DEVICE SELECTION

SELECT NEW CONNECTION DESTINATION DEVICE AND CLICK [SETTING]

| SERIAL NUMBER | MAC ADDRESS | IP ADDRESS |
|---|---|---|
| A1234567 | AA:BB:CC:DD:EE:FF | 192.168.11.5 |
| B7654321 | FF:EE:DD:CC:BB:AA | 192.168.11.8 |

UPDATE    SETTING    CANCEL

INFORMATION PROCESSING APPARATUS, CONTROL METHOD, AND STORAGE MEDIUM

BACKGROUND OF THE INVENTION

1. Field of the Invention

The present inventions relate to at least one device control system for an information processing apparatus to control a device via a network, at least one control method and at least one storage medium.

2. Description of the Related Art

Up to now, a configuration in which a static address (MAC address) and a variable address (IP address) are used when a device is controlled via a network has been proposed. Here, to cope with the configuration in which the variable address (IP address) of the control target device is variable, transmission of a message by way of broadcast or unicast is performed. A technology for detecting a new variable address (IP address) by using a static address (MAC address) included in a response to the message as a clue has been proposed (Japanese Patent Laid-Open No. 2006-340286).

However, according to the above-described related art technology, in a case where a communication is no longer established since the variable address (IP address) of the control target device is changed, a new variable address (IP address) is detected by using the static address (MAC address) as a clue. As a result, the technology may not cope with a case where the static address (MAC address) is changed or a case where a device having a different static address (MAC address) is to be designated for a new communication destination.

SUMMARY OF THE INVENTION

In view of the above, the present inventions aim at making it possible to easily set a new communication device for a new connection or transmission destination. There is provided an information processing apparatus that holds network information of a target device corresponding to a data transmission target, the information processing apparatus including: a transmission unit that transmits or attempts to transmit data to the target device by using the network information; and a modifying unit that modifies a Media Access Control (MAC) address included in the held network information to a MAC address of a device having same device identification information as the target device among a plurality of devices that can communicate with the information processing apparatus in a case where a communication with the target device is not established. In one or more embodiments, when the modifying unit modifies the MAC address, the transmission unit transmits the data to the device having the same device identification information as the target device.

According to other aspects of the present inventions, other information processing apparatuses, control methods and storage mediums are discussed herein.

Further features of the present inventions will become apparent from the following description of exemplary embodiments with reference to the attached drawings.

BRIEF DESCRIPTION OF THE DRAWINGS

FIG. 6 illustrates an example of a device selection screen according to the first exemplary embodiment.

DESCRIPTION OF THE EMBODIMENTS

First, to carry out one or more of the present inventions, a device configuration according to an exemplary embodiment of the present inventions will be described with reference to FIG. 1A and FIG. 1B.

Figure 1A:
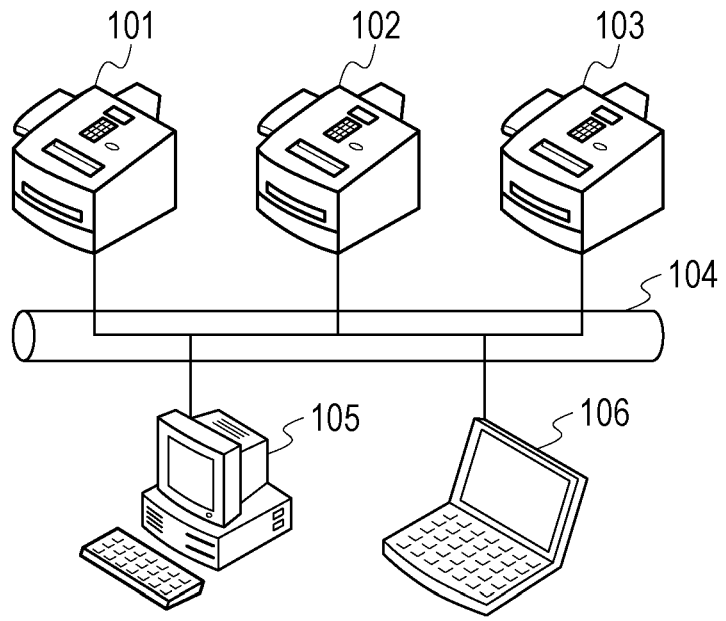
FIG. 1A and FIG. 1B illustrate an example of a device configuration of at least one embodiment of the present inventions.

In FIG. 1A, a device A, a device B, and a device C are respectively denoted by reference symbols 101, 102, and 103. The device A, the device B, and the device C are connected to a wired network 104. An information processing apparatus A and an information processing apparatus B are respectively denoted by reference symbols 105 and 106. The information processing apparatus A and the information processing apparatus B are similarly connected to the wired network 104. With this configuration, the information processing apparatus A or the information processing apparatus B can control the device A, the device B, and the device C via the wired network 104.

Figure 1B:
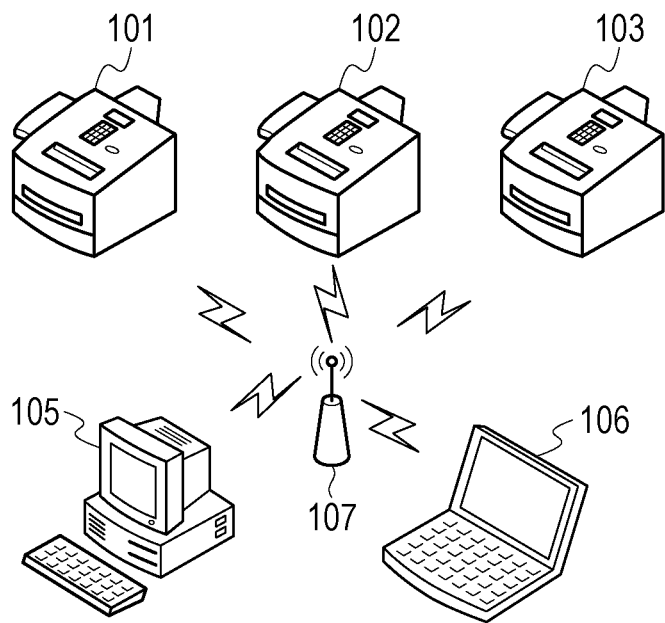

A wireless network router 107 is illustrated in FIG. 1B. A difference between FIG. 1A and FIG. 1B resides only in that the information processing apparatuses and the devices are connected via the wired network 104 or connected via the wireless network router 107.

The device A, the device B, and the device C have at least one of a print function, a scan function, and a FAX function. Of course, the device may be a multifunction device provided with the print function, the scan function, and the FAX function.

Hereinafter, exemplary embodiments of the present inventions will be described in detail with reference to the accompanying drawings. It is noted that the following exemplary embodiments are not intended to limit the scope of the present inventions, and not all of combinations of characteristics described in the present exemplary embodiment are necessarily required for a solution of the present inventions.

Figure 2:
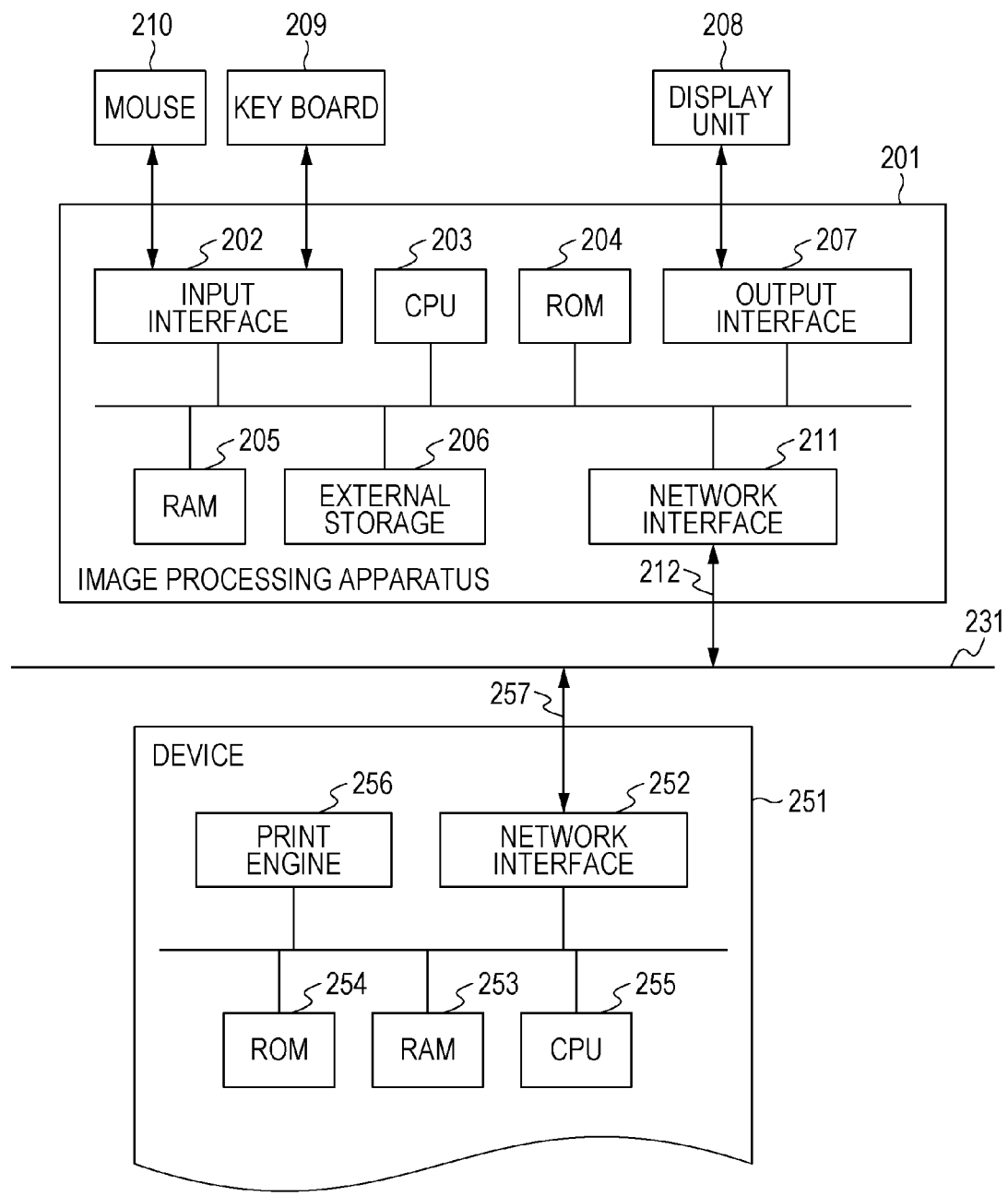
FIG. 2 is a hardware configuration diagram of a device 251 (such as, but not limited to, at least one embodiment of any of the devices 101, 102, and 103 in FIG. 1A and FIG. 1B) and an image processing apparatus 201 (such as, but not limited to, at least one embodiment of any of the image processing apparatuses 105 and 106 in FIG. 1A and FIG. 1B).

A hardware configuration diagram of a device 251 (the devices 101, 102, and 103 in FIG. 1A and FIG. 1B) and an image processing apparatus 201 (the image processing apparatuses 105 and 106 in FIG. 1A and FIG. 1B) connected via a network 231 will be described by using FIG. 2.

The image processing apparatus 201 includes an input interface 202, a CPU 203, a ROM 204, a RAM 205, an external storage 206, an output interface 207, a display unit 208, a key board 209, a mouse 210, and a network interface 211. The network interface 211 is connected to the network 231 via a network cable 212. The ROM 204 stores an initialization program, and the external storage 206 saves a group of application programs, an operating system (OS), a device driver, and other various data. The RAM 205 is used by the various programs stored in the external storage 206 as a work memory. The device 251 includes a network interface 252, a RAM 253, a print engine 256, a ROM 254, and a CPU 255. The network interface 252 is connected to the network 231 via a network cable 257. The RAM 253 is used as a main memory of the CPU 255 and a work memory. The RAM 253 saves data of a reception buffer that temporarily saves received print data and other data. The print engine 256 performs printing on the basis of the data saved in the RAM 253. The ROM 254 stores various control programs and data used by the respective control programs. The CPU 255 controls the respective units of the device in accordance with these control programs. Herein, assigning tasks of the processings for the image processing apparatus 201 and the device 251 are illustrated in the above-described manner as an example, but the mode of the assigning tasks is not particularly limited to the above, and other mode may also be adopted.

Figure 3:
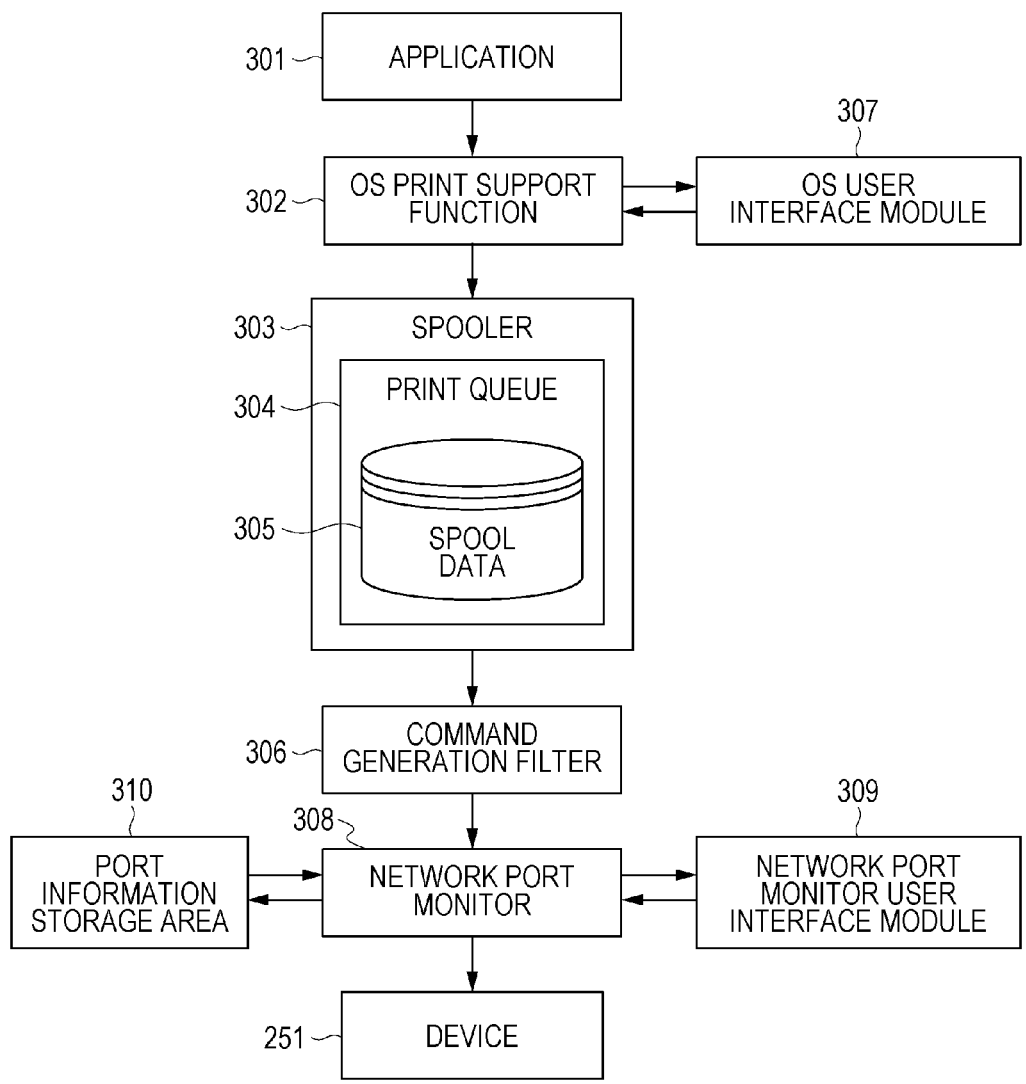
FIG. 3 illustrates a diagram of at least one embodiment of the image processing apparatus involving a hardware and software configuration.
Figure 8:
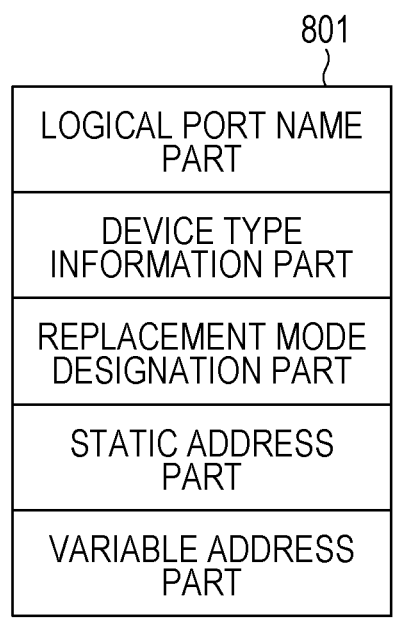
FIG. 8 illustrates an example of port information according to at least one embodiment of the present inventions.
Figure 10:
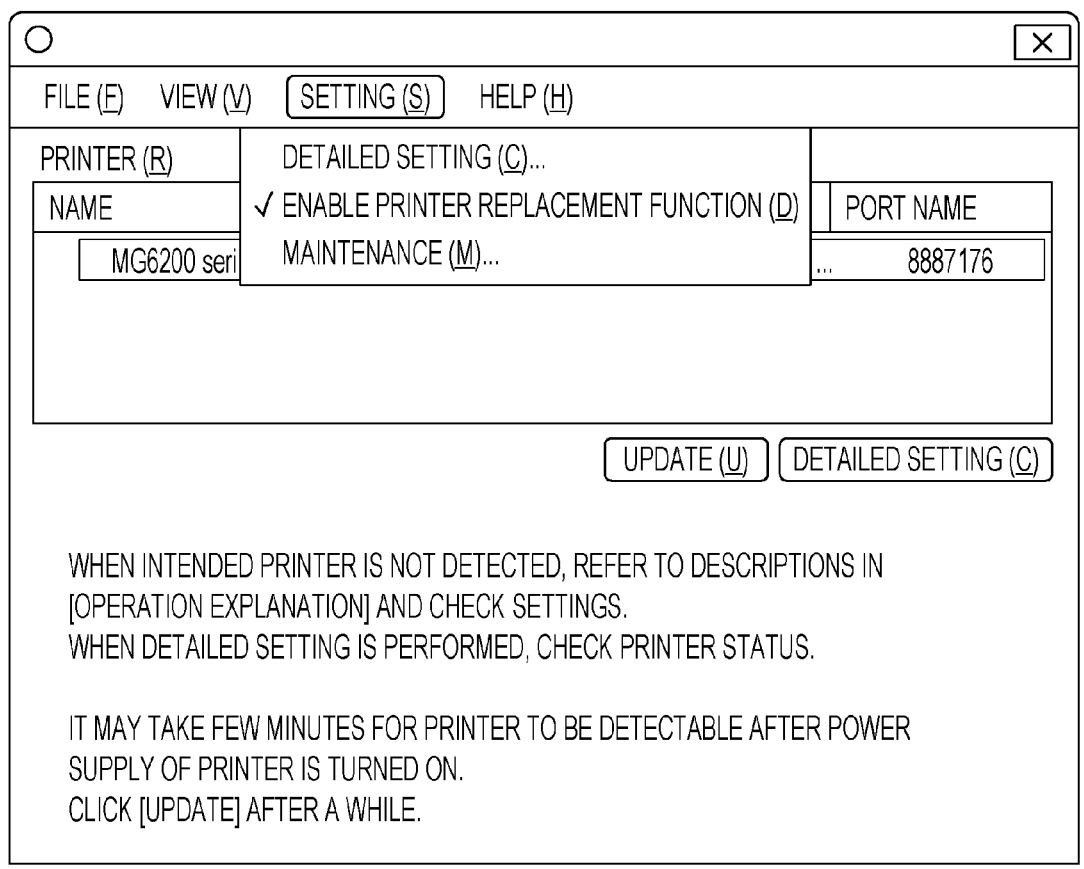
FIG. 10 illustrates an example of a setting screen of a replacement function according to at least one embodiment of the present inventions.

A software configuration diagram of the image processing apparatus 201 (105, 106) will be described by using FIG. 3. Application data created by an application 301 is temporarily accumulated in a print queue 304 of a spooler 303 via an OS print support function 302 as spool data 305. The accumulated spool data 305 is converted by a command generation filter 306 into print data that can be interpreted by the device 251 and thereafter transmitted to the device 251. It is noted that the command generation filter 306 is a filter of a printer driver. When a print instruction is issued, the application 301 adds print setting information returned from an OS user interface module 307 via the OS print support function 302 to application data. The print setting information is information that has been set prior to the print start instruction from the application 301. The command generation filter 306 generates print data that can be interpreted by the device 251 on the basis of the application data and the print setting information. Thereafter, the print data output from the command generation filter 306 is sequentially read out by the spooler 303 and transmitted to the device 251 via a network port monitor 308. The network port monitor 308 executes display control processing for displaying a user interface that can accept a user instruction by using a network port monitor user interface module 309 as appropriate. The network port monitor user interface module 309 accepts the user instruction via the displayed user interface and also notifies the network port monitor 308 of the result. The network port monitor 308 stores port information 801 of FIG. 8 in which the device 251 is linked to the command generation filter 306 in the RAM 205 and the external storage 206 of the image processing apparatus 201. The network port monitor 308 transmits the print data to the device 251 by using the port information 801. Here, a generation method for the port information 801 will be described. In a case where the device driver of the device 251 used for printing is installed, the network port monitor 308 issues a device information request command by way of broadcast. Subsequently, in a case where a device having same identification information (for example, a same name) as the device used for the printing replies a device information response command as a response to the device information request command, the port information of FIG. 8 is generated by using response contents of the device. Information registered in a replacement mode designation part of FIG. 8 is used for processing according to a second exemplary embodiment which will be described below. The port information is stored in a port information storage area 310. It is noted that the processings according to first and second exemplary embodiments of the present application are executed in a case where a setting is made to enable a printer replacement function in a screen of FIG. 10.

First Exemplary Embodiment

Figure 4:
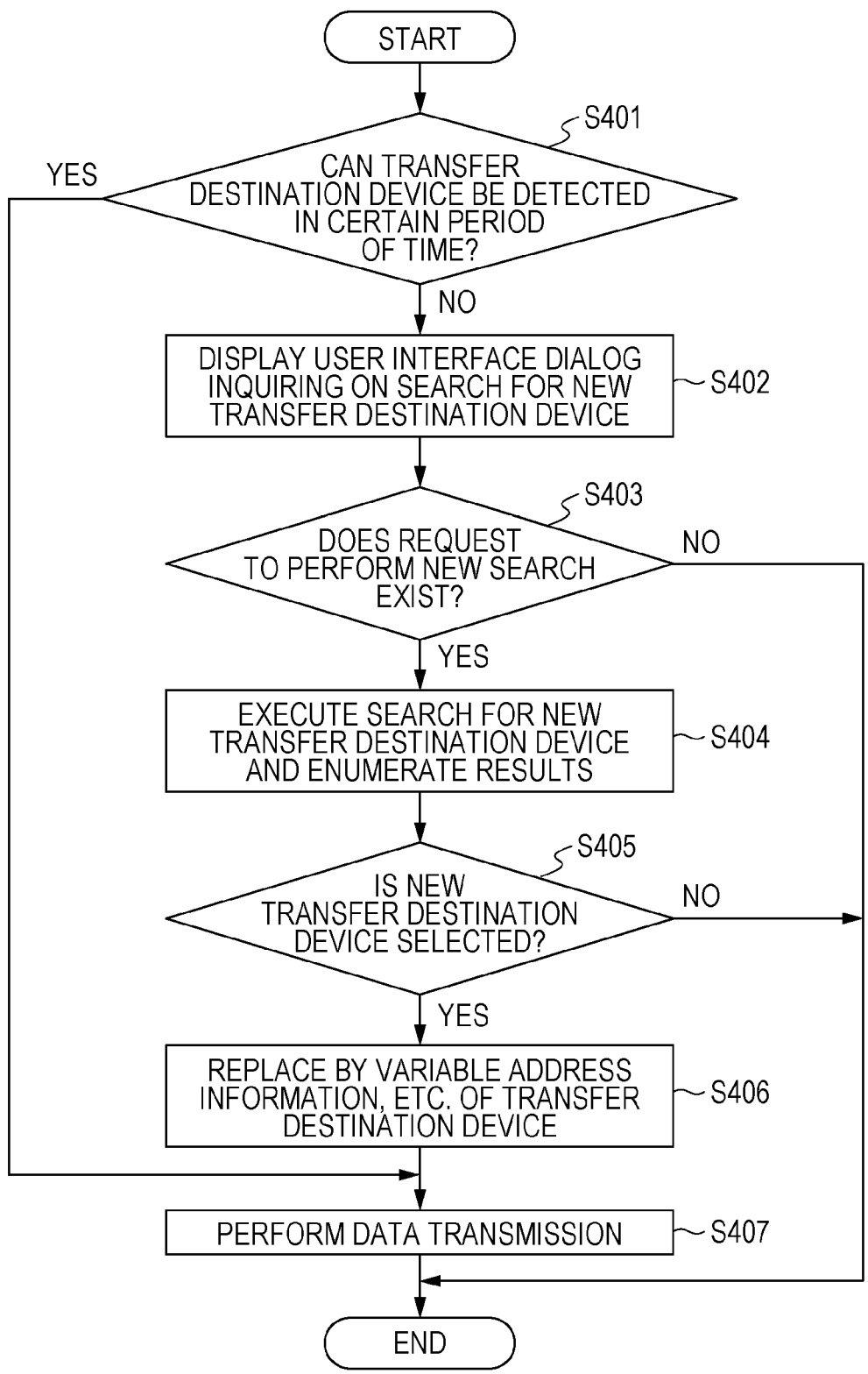
FIG. 4 is a flow chart of a processing flow according to a first exemplary embodiment of the present inventions.

The processing of the network port monitor 308 according to a first exemplary embodiment of the present inventions will be described by using a flow chart of FIG. 4. It is noted that the flow chart of the present application is realized while a program related to the flow chart is read out from a memory and executed by the CPU 203.

Figure 9A:
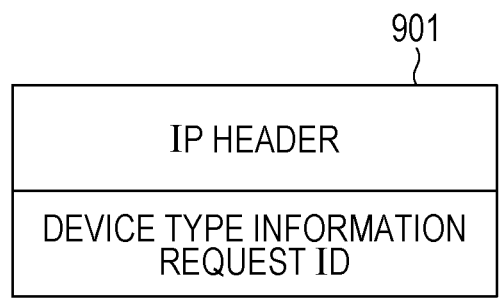
FIG. 9A and FIG. 9B illustrate examples of a device type information request command and a device type information response command according to at least one embodiment of the present inventions.
Figure 9B:
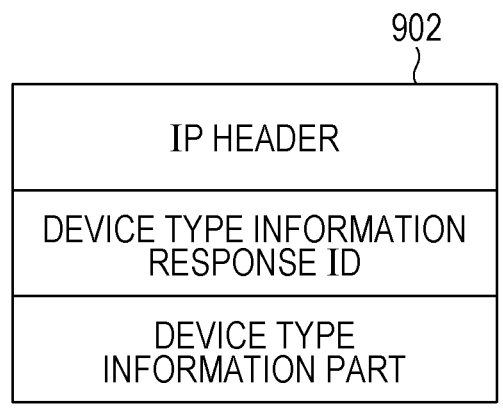

In step S401, the network port monitor 308 performs a detection as to whether or not transmission and reception of print data can be performed within a predetermined period of time. The network port monitor 308 attempts transmission processing of transmitting the print data transmitted via the command generation filter 306 to the device. Before the network port monitor 308 attempts the transmission processing of transmitting the print data to the device, the network port monitor 308 obtains a device type discrimination command to check if the device at the transmission destination is properly functioning. The network port monitor 308 transmits a device information request command 901 illustrated in FIG. 9A onto the network 231 as a broadcast message to obtain the device type discrimination command. In a case where the device at the transmission destination is properly functioning, a device information response command 902 illustrated in FIG. 9B is immediately replied to the image processing apparatus 201. The network port monitor 308 compares a device type information part in the replied device information response command 902 and static address information included in an IP header with device type information in the port information 801 stored in the image processing apparatus 201. As a result of the comparison, in a case where the device type information and the static address information are matched, the network port monitor 308 determines that the device can be properly detected. In a case where this detection is not performed within a previously set predetermined period of time, the flow proceeds to step S402. In step S402, the network port monitor 308 displays a user interface dialog 501 illustrated in FIG. 5. A message "do you want to search for new connection destination device?" is displayed on the user interface dialog 501, and an instruction result with respect to the user interface dialog 501 is received. Herein, the network port monitor 308 accepts the result instructed via the user interface dialog 501 of FIG. 5 and determines whether or not a request for performing a new search is issued (S403). That is, in a case where the user inputs a command for performing the new device search (the user instructs a "Yes" button), and the result is received by the network port monitor 308, the flow proceeds to step S404.

In step S404, the network port monitor 308 first performs the new device search. The new device search is performed by obtaining the device type discrimination command. To obtain the device type discrimination command, the network port monitor 308 transmits (inquiry) the device information request command 901 illustrated in FIG. 9A onto the network 231 as the broadcast message. The network port monitor 308 displays a device selection screen on which only the new devices having the same device type information part in the device information response command 902 as the device type information in the port information 801 among all the new devices that have responded to the broadcast message are enumerated. For example, a case of the same device type information includes a case where the device name is the same, a case where the device identification information is the same, or the like. FIG. 6 illustrates an example of the device selection screen displayed in S404.

After the screen of FIG. 6 is displayed, in step S405, the network port monitor 308 determines whether or not the new connection destination the device is selected by the user from among the new devices enumerated on the screen of FIG. 6. That is, it is determined whether or not the user selects the new device (the device on the first row or the device on the second row in the example of FIG. 6) on the screen of FIG. 6 and instructs a setting button.

In S405, when it is determined that the new connection destination is selected, the flow proceeds to step S406. In step S406, the network port monitor 308 replaces the static address part and the variable address part of the device in the port information 801 by a static address and a variable address of the newly selected device by using the device information response command 902. That is, the network port monitor 308 modifies the port information of FIG. 8 (also referred to as network information) by using the transmission destination information of the device which has the same device identification information as the selection target device.

Subsequently, the network port monitor 308 continues the transmission of the print data on the basis of the replaced new static address (MAC address) and the replaced new variable address (IP address). The replacement target corresponds to the device newly selected on the screen of FIG. 6.

Here, example advantages of the present exemplary embodiment will be described. A case will be supposed where the device A101 is no longer usable because of a failure or the like in a state in which the user selects the device A101 from the information processing apparatus A105 and performs printing or scanning. The user desires to use the device B102 or the device C103 that is the same device type as the device A101 for the new connection destination as the replacement device. At this time, according to the present exemplary embodiment, since the device that is the same device type as the device used before the modification is displayed as a candidate for the new connection destination (for example, FIG. 6), the user can select the device having a different static address (MAC address), for example, for the new connection destination. The network port monitor 308 then replaces the port information of FIG. 8 with information of the device at the new connection destination. For that reason, the network port monitor 308 can also continue the transmission of the print data or the like to the device having the different static address (MAC address). That is, it is not necessary to install the device driver at the new connection destination again or set the network information again, and the user operability is improved. It is noted that according to the present exemplary embodiment, since the device desired by the user can be selected by using the screen of FIG. 6, a possible setting of the device that is not intended by the user for the new connection destination can be avoided.

Second Exemplary Embodiment

According to the first exemplary embodiment, the device at the new connection destination is determined while the device selection screen of FIG. 6 is displayed. According to the present second exemplary embodiment, processing of setting the new connection destination without displaying the device selection screen of FIG. 6 will be described.

Figure 5:
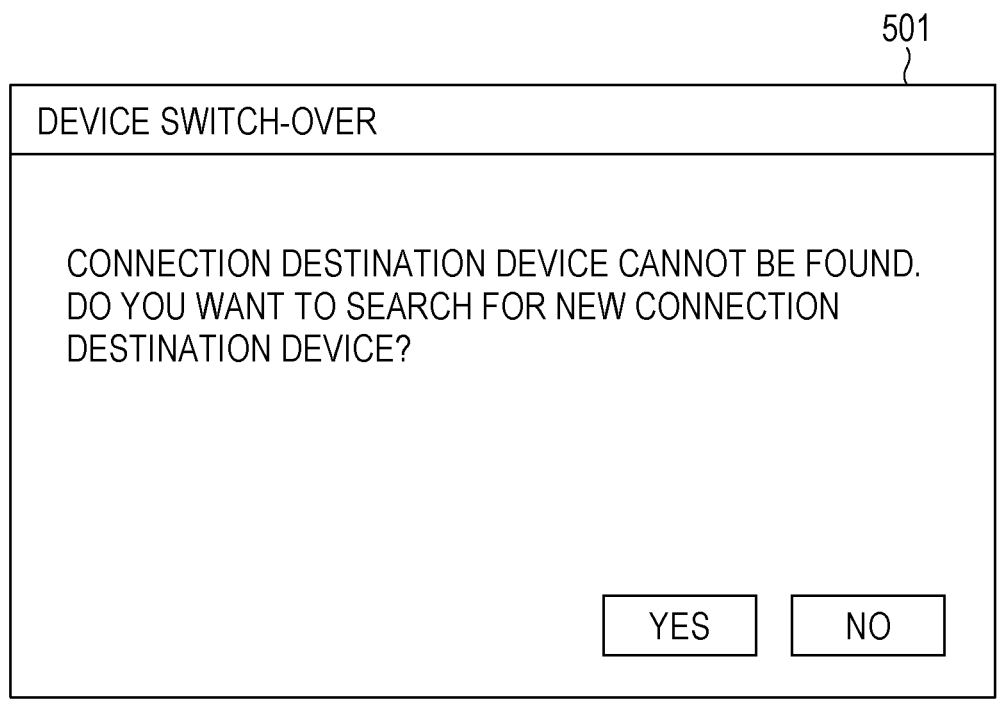
FIG. 5 illustrates an example of the user interface dialog screen according to the first exemplary embodiment.
Figure 7:
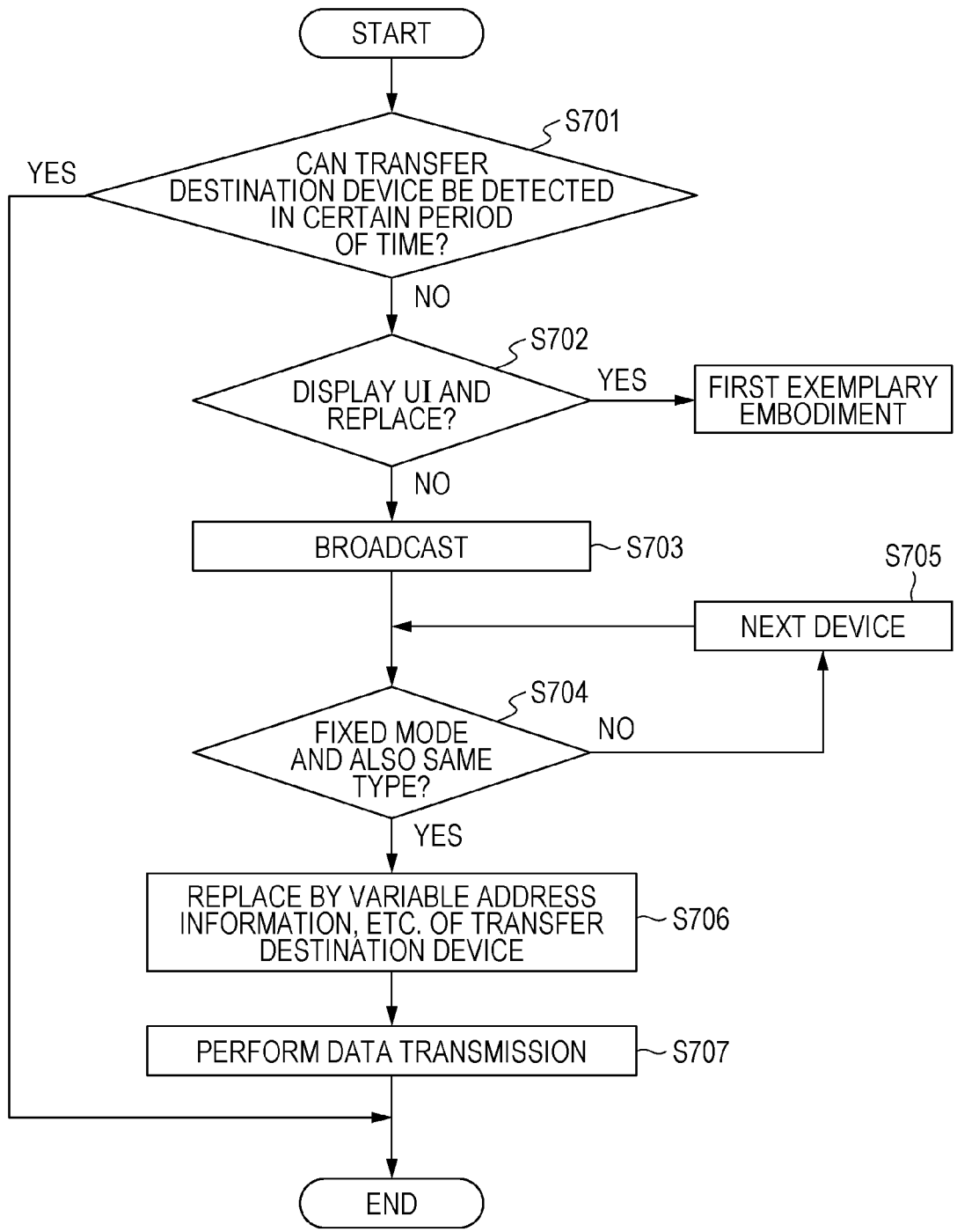
FIG. 7 is a flow chart of a processing flow according to a second exemplary embodiment of the present inventions.

A flow of processing of the network port monitor 308 according to the second exemplary embodiment of the present inventions will be described by using a flow chart of FIG. 7. The second exemplary embodiment is different from the first exemplary embodiment in that the user interface dialogs of FIG. 5 and FIG. 6 are not displayed. Determination processing in S702 that will be described below is switched depending on contents registered in the replacement mode designation part in the port information 801 stored in the RAM 205 of the image processing apparatus 201.

The network port monitor 308 performs processing in step S701. Since the processing in S701 is the same as the processing in S401, detailed descriptions thereof will be omitted. In step S702, the network port monitor 308 performs the determination in S702 by checking the contents in the replacement mode designation part of FIG. 8. A UI display mode or a UI non-display mode is included in the device information response command that is obtained when the network port monitor 308 creates the port information of FIG. 8. In a case where the UI display mode is included in the device information response command, the UI display mode is set in the replacement mode designation part of FIG. 8. On the other hand, in a case where the UI non-display mode is included in the device information response command, the UI non-display mode is set in the replacement mode designation part of FIG. 8. In a case where the UI display mode is registered in the replacement mode designation part of FIG. 8, the network port monitor 308 determines Yes in S702 and executes the processings in S402 and subsequent steps according to the first exemplary embodiment. On the other hand, in a case where the UI non-display mode is registered in the replacement mode designation part of FIG. 8, the network port monitor 308 determines No in S702 and issues the device information request command 901 by way of broadcast. The network port monitor 308 performs the determination in the order of reception of the device information response command with respect to the command issued in S703 (S704). That is, the network port monitor 308 determines whether or not both of information indicating the fixed mode and the same device type information as the device type information of the device selected for the printing (the device type information part of FIG. 8) are included in the device information response command. If both of the information are not included in the device information response command (S704—No), the network port monitor 308 selects the device information response command received next as the determination target (S705) and executes the determination processing in S704 again.

In S704, in a case where both of the information are included in the device information response command (S704—Yes), the network port monitor 308 executes the processings in S706 and S707. Since the processings in S706 and S707 are the same as the processings in S406 and S407 according to the first exemplary embodiment, detailed descriptions thereof will be omitted. Therefore, according to the second exemplary embodiment, in a case where a plurality of devices transmit the device information response command including the information indicating the fixed mode and the same device type information as the device type information of the device selected for the printing (the device type information part of FIG. 8), the device that has transmitted the device information response command in the first place is selected for the next transmission destination.

For example, the user connects the image processing apparatus 201 to the device A on a one-to-one basis to be used and executes the output processing by using the device driver for the device A. A case will be supposed where the user establishes the network connection by using the same image processing apparatus 201 and the device B that is the same device type as the device A at a later date. Here, since the device used by the user is modified from the device A to the device B, a static address (MAC address) is also modified. According to the present second exemplary embodiment, in the above-described case, the print data can be continuously transmitted to the device B without accepting the operation of the user by automatically modifying the port information created for the device A into the contents for the new device B.

OTHER EMBODIMENTS

Embodiment(s) of the present inventions can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the exemplary embodiments of the present inventions, the new communication device can be easily set for the new connection destination.

While the present inventions have been described with reference to exemplary embodiments, it is to be understood that the inventions are not limited to the disclosed exemplary embodiments. The scope of the following claims is to be accorded the broadest interpretation so as to encompass all such modifications and equivalent structures and functions.

This application claims the benefit of Japanese Patent Application No. 2014-026097, filed Feb. 14, 2014, which is hereby incorporated by reference herein in its entirety.

What is claimed is:

1. An information processing apparatus that holds network information of a target device corresponding to a data transmission target, the information processing apparatus comprising:
at least one processor and at least one memory coupled to each other and operating to:
transmit or attempt to transmit data to the target device by using the network information;
transmit an inquiry notification by way of broadcast in a case where communication with the target device is not established;
display, in a case where a response to the inquiry notification is received from a device having same device identification information as the target device, a device selection screen including content or contents of the response; and
modify a Media Access Control (MAC) address included in the held network information to a MAC address of a device selected via the device selection screen.

2. The information processing apparatus according to claim 1, wherein, when the at least one processor and the at least one memory modify the MAC address, at least one processor and the at least one memory further operate to transmit the data to the device having the same device identification information as the target device.

3. The information processing apparatus according to claim 1,
wherein the at least one processor and the at least one memory further operate to generate print data for transmission to the device having the same device identification information as the target device by using a same device driver as a device driver of the target device, and
wherein, after the print data is generated, the print data is transmitted to the device having the same device identification information as the target device.

4. The information processing apparatus according to claim 1,
wherein the at least one processor and the at least one memory further operates to determine whether a first mode for modifying the network information by displaying the device selection screen or a second mode for modifying the network information without displaying the device selection screen is selected,
wherein the at least one processor and the at least one memory modify the MAC address included in the held network information to a MAC address of the device selected via the device selection screen when it is determined that the first mode is selected, and the at least one processor and the at least one memory modify the MAC address included in the held network information by using a MAC address of the device that has the same device identification information as the target device and also has responded to a device search command in a first place when it is determined that the second mode is selected.

5. A control method for an information processing apparatus that holds network information of a target device corresponding to a data transmission target, the control method comprising:
transmitting, or attempting transmission of, data to the target device by using the network information;
transmitting an inquiry notification by way of broadcast in a case where communication with the target device is not established;
displaying, in a case where a response to the inquiry notification is received from a device having same device identification information as the target device, a device selection screen including content or contents of the response; and
modifying a Media Access Control (MAC) address included in the held network information to a MAC address of a device selected via the device selection screen.

6. The control method according to claim 5, further comprising: when the MAC address is modified in the case where the communication with the target device is not established, transmitting the data to the device having the same device identification information as the target device.

7. The control method according to claim 5, further comprising:
generating print data for transmission to the device having the same device identification information as the target device by using a same device driver as a device driver of the target device, wherein, after the print data is generated, the print data is transmitted to the device having the same device identification information as the target device.

8. The control method according to claim 5, further comprising:
determining whether a first mode for modifying the network information by displaying the device selection screen or a second mode for modifying the network information without displaying the device selection screen is selected,
wherein the MAC address included in the held network information is modified to a MAC address of the device selected via the device selection screen when it is determined that the first mode is selected, and the MAC address included in the held network information is modified by using a MAC address of the device that has the same device identification information as the target device and also has responded to a device search command in a first place when it is determined that the second mode is selected.

9. A non-transitory storage medium storing a program configured to cause a computer included in an information processing apparatus that holds network information of a target device corresponding to a data transmission target to perform or execute a control method, the control method comprising:
transmitting, or attempting transmission of, data to the target device by using the network information;
transmitting an inquiry notification by way of broadcast in a case where communication with the target device is not established;
displaying, in a case where a response to the inquiry notification is received from a device having same device identification information as the target device, a device selection screen including content or contents of the response; and
modifying a Media Access Control (MAC) address included in the held network information to a MAC address of a device selected via the device selection screen.

10. The storage medium according to claim 9, wherein, when the MAC address is modified in the case where the communication with the target device is not established, the data is transmitted to the device having the same device identification information as the target device.

11. The storage medium according to claim 9, wherein print data for transmission to the device having the same device identification information as the target device is generated by using a same device driver as a device driver of the target device, and, after the print data is generated, the print data is transmitted to the device having the same device identification information as the target device.

12. The storage medium according to claim 9, wherein
a determination is made on whether a first mode for modifying the network information by displaying the device selection screen or a second mode for modifying the network information without displaying the device selection screen is selected, and
the MAC address included in the held network information is modified to a MAC address of the device selected via the device selection screen when it is determined that the first mode is selected, and the MAC address included in the held network information is modified by using a MAC address of the device that has the same device identification information as the target device and also has responded to a device search command in a first place when it is determined that the second mode is selected.

* * * * *